US012716765B2

(12) United States Patent
Benjamin Raj et al.

(10) Patent No.: US 12,716,765 B2
(45) Date of Patent: Aug. 25, 2026

(54) SYSTEMS AND METHODS FOR DETECTING MALFUNCTIONS WITHIN A GAS DISTRIBUTION SYSTEM

(71) Applicant: Applied Materials, Inc., Santa Clara, CA (US)

(72) Inventors: Daemian Raj Benjamin Raj, Fremont, CA (US); Hassan Ali, Santa Clara, CA (US); Travis Clark Mazzy, Fremont, CA (US); Thorsten Kril, Santa Cruz, CA (US); Vignesh Kumar Venkateshwar, Sunnyvale, CA (US); Venkatanarayana Shankaramurthy, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 180 days.

(21) Appl. No.: 18/373,754

(22) Filed: Sep. 27, 2023

(65) Prior Publication Data

US 2025/0076097 A1 Mar. 6, 2025

Related U.S. Application Data

(60) Provisional application No. 63/536,918, filed on Sep. 6, 2023.

(51) Int. Cl.
*G01F 25/10* (2022.01)
*G01M 3/28* (2006.01)
(Continued)

(52) U.S. Cl.
CPC ........... *G01F 25/10* (2022.01); *G05D 7/0617* (2013.01); *F17D 5/00* (2013.01); *G01M 3/2815* (2013.01)

(58) Field of Classification Search
CPC .... G01F 25/10; G05D 7/0617; G01M 3/2815; F17D 5/00
(Continued)

(56) References Cited

U.S. PATENT DOCUMENTS 5,677,480 A 10/1997 Liyanage et al.
9,928,724 B2 3/2018 Alcorn
(Continued)

FOREIGN PATENT DOCUMENTS

KR 960042476 A 12/1996
KR 20080080832 A 9/2008

OTHER PUBLICATIONS

International Search Report and Written Opinion for International Application No. PCT/US2024/044276, mailed Dec. 16, 2024, 8 Pages.

*Primary Examiner* — Peter J Macchiarolo
*Assistant Examiner* — John M Royston
(74) *Attorney, Agent, or Firm* — Lowenstein Sandler LLP

(57) ABSTRACT

Systems and methods for monitoring and detecting a malfunction within a gas distribution system are provided. A system may first enable, by a controller, gas flow through a flow path of the gas distribution system. Afterwards, the system may receive data including pressure data and/or flow rate data associated with the flow path of the gas distribution system while gas flow is enabled through the flow path. The system may process the data to determine whether the first flow path of the gas distribution system includes a malfunction. Responsive to determining that the flow path includes a malfunction, the system may determine a relative location of the malfunction within the flow path, with respect to a mass flow controller (MFC) or sensor within the flow path.
(Continued)

The system may generate a report indicating whether the flow path includes a malfunction and a relative location of any determined malfunction.

19 Claims, 8 Drawing Sheets

(51) Int. Cl.
*G05D 7/06* (2006.01)
*F17D 5/00* (2006.01)

(58) Field of Classification Search
USPC .......................................................... 73/195
See application file for complete search history.

(56) References Cited

U.S. PATENT DOCUMENTS

2010/0095890 A1 4/2010 Gebele et al.
2017/0322568 A1* 11/2017 Kumar .............. H01L 21/67017
2018/0188085 A1 7/2018 Patel
2019/0120112 A1* 4/2019 Ito .......................... F02M 26/15
2019/0120677 A1* 4/2019 Arunachalam ....... G01F 15/063
2019/0186951 A1* 6/2019 Edwards ........... H02J 13/00022
2019/0331547 A1 10/2019 Enev
2021/0132015 A1 5/2021 Bang et al.
2021/0320027 A1 10/2021 Huang
2022/0170897 A1* 6/2022 Kamei ................. G01N 1/2226

* cited by examiner 240C
222
220
209
210
Line 224
218
216
208
207
Gas stick assembly 214
206
205
215
204
202
201
203
212A
212B 240D
222
220
209
210
Line 224
218
216
208
207
Gas stick assembly 214
206
205
215
204
202
201
203
212A
212B 240E
226
222
220
209
210
Line 224
218
216
228
208
207
Gas stick assembly 214
206
205
215
204
202
201
203
212A
212B

SYSTEMS AND METHODS FOR DETECTING MALFUNCTIONS WITHIN A GAS DISTRIBUTION SYSTEM

CROSS-REFERENCE AND RELATED APPLICATIONS

This application claims the benefit of U.S. Provisional Patent Application No. 63/536,918; filed on Sep. 6, 2023.

TECHNICAL FIELD

Embodiments of the present disclosure relate generally to systems and methods for monitoring component integrity within a gas distribution system (GDS).

BACKGROUND

Gas distribution systems used today are tools used to deliver, manage, and employ gasses and gas applications within modern manufacturing systems and manufacturing designs. Such modern gas distribution systems (GDSs) are systems and associated components that may be designed for handling both inert and toxic gasses in numerous applications such as purging, venting, or reaction applications, with respect to a process chamber or manufacturing space. For example, in some manufacturing applications, GDSs can be used to remove or dilute harmful substances, maintain proper environmental conditions, deliver process gasses (e.g., for etching, physical vapor deposition (PVD), chemical vapor deposition (CVD), atomic layer deposition (ALD), etc.) or ensure that various processes are carried out under controlled and stable pressure conditions. In other cases, GDSs may include functions such as purging (e.g., such as purging oxygen to prevent unwanted oxidation reactions), and/or for using specialized vacuum systems to eliminate contaminants from a working environment. Such functions can be useful for maintaining product and process integrity and quality, and GDSs can facilitate such, while promoting safe practice, stability, and repeatability for such processes.

A modern GDS may include components of a wide variety, ranging from various types, functions, and methodologies to distribute and exhaust gasses effectively. Common components found within a GDS may include a gas panel, gas sources, gas stick assemblies, flow conduits, gas valves, flow regulators, mass flow controllers (MFCs), pressure transducers, and sensors (to name a few components), which are aggregately used to manage and deliver gas to and from chambers and spaces in a controlled manner. In an example that combines some components, a gas source of a GDS may provide the raw gas (e.g., such as toxic Ammonia gas, inert Nitrogen gas, or other similar gasses), to pass through a gas stick assembly, which may include valves, sensors, and regulators, to start, pause, diminish, increase, and otherwise regulate and measure a flow and pressure of a gas through the assembly.

Such combinations of components can be complex, and rely on commensurate sophistication in associated control mechanisms. Traditionally, once a gas distribution system is assembled, lengthy manual testing is performed to determine if the gas distribution system was assembled incorrectly and/or whether there are any malfunctions of the gas distribution system. Such manual testing is error prone and can consume a large amount of a technician's time.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some embodiments of the present disclosure, a method for detecting a malfunction within a gas distribution system is provided. The method includes enabling, by a controller, gas flow through a first flow path of the gas distribution system. The method further includes receiving first data comprising at least one of first pressure data or first flow rate data associated with the first flow path of the gas distribution system, while gas flow is enabled through the first flow path. The system further includes processing the first data to determine whether the first flow path of the gas distribution system comprises a malfunction. The system further includes, responsive to determining that the first flow path comprises a malfunction, determining a relative location of the malfunction within the first flow path, with respect to at least one of a pressure sensor or a flow sensor within the first flow path. The system further includes generating a report indicating whether the first flow path comprises a malfunction and a relative location of any determined malfunction.

In some embodiments of the present disclosure, a non-transitory computer readable storage medium is provided. The non-transitory computer readable storage medium includes instructions that, when executed by a processing device, causes the processing device to perform operations. The operations include enabling, by a controller, gas flow through a first flow path of the gas distribution system. The operations further include receiving first data comprising at least one of first pressure data or first flow rate data associated with the first flow path of the gas distribution system while gas flow is enabled through the first flow path. The operations further include processing the first data to determine whether the first flow path of the gas distribution system comprises a malfunction. The operations further include, responsive to determining that the first flow path comprises a malfunction, determining a relative location of the malfunction within the first flow path, with respect to at least one of a pressure sensor or a flow sensor within the first flow path. The operations further include generating a report indicating whether the first flow path comprises a malfunction and a relative location of any determined malfunction.

In some embodiments, of the disclosure, a system is provided. The system includes a memory device and a processing device communicatively coupled to the memory device. The processing device is to enable, by a controller, gas flow through a first flow path of the gas distribution system. The processing device is further to receive first data comprising at least one of first pressure data or first flow rate data associated with the first flow path of the gas distribution system while gas flow is enabled through the first flow path; process the first data to determine whether the first flow path of the gas distribution system comprises a malfunction. The processing device is further to, responsive to determining that the first flow path comprises a malfunction, determining a relative location of the malfunction within the first flow path, with respect to at least one of a pressure sensor or a flow sensor within the first flow path. The processing device is further to generate a report indicating whether the first flow path comprises a malfunction and a relative location of any determined malfunction.

BRIEF DESCRIPTION OF THE DRAWINGS

The present disclosure is illustrated by way of example, and not by way of limitation, in the figures of the accompanying drawings in which like references indicate similar elements. It should be noted that different references to “an” or “one” embodiment in this disclosure are not necessarily to the same embodiment, and such references mean at least one.

The drawings, described below, are for illustrative purposes only and are not necessarily drawn to scale. The drawings are not intended to limit the scope of the disclosure in any way.

DETAILED DESCRIPTION OF EMBODIMENTS

Figure 1:
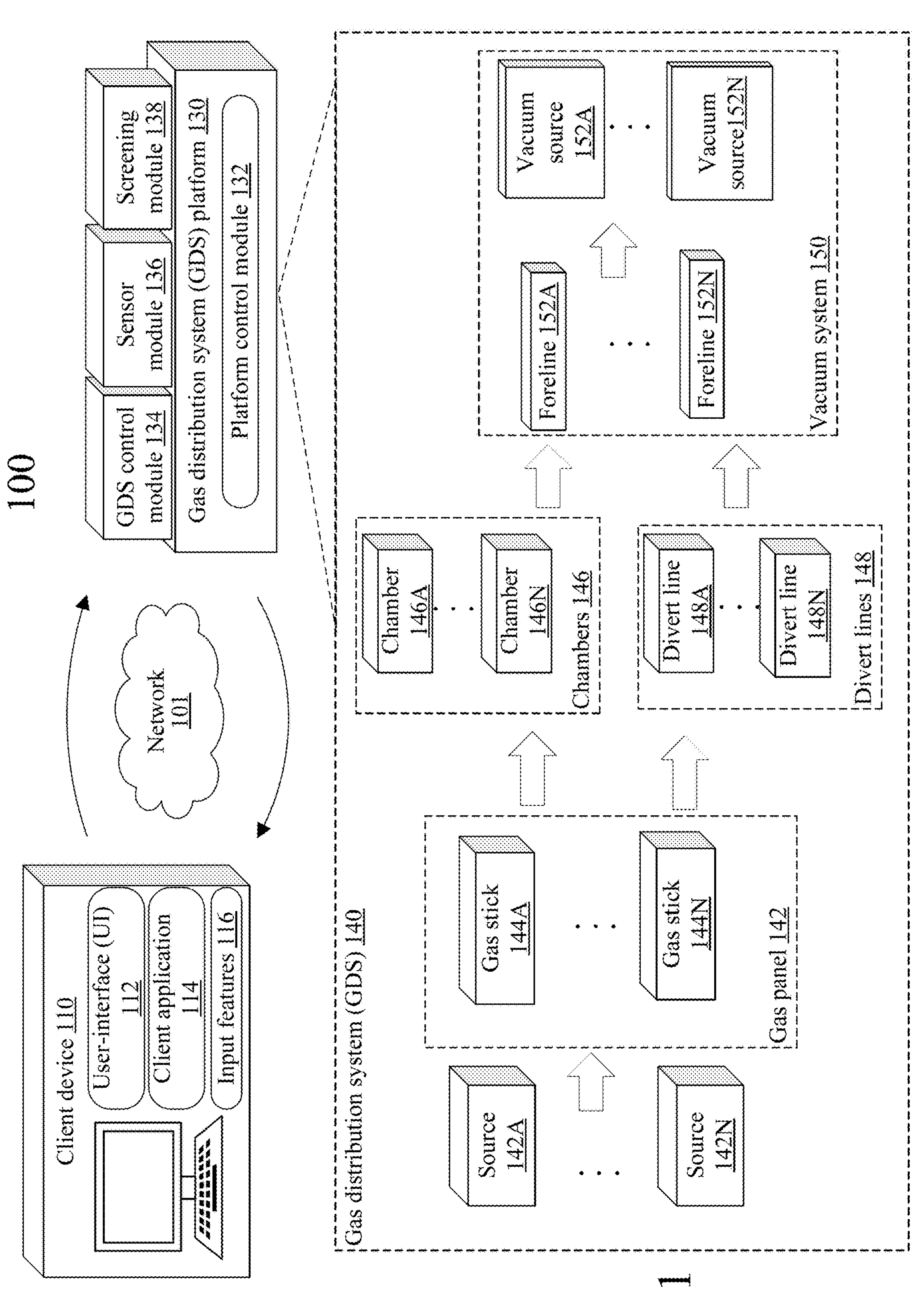
FIG. 1 illustrates a system capable of detecting a malfunction within a gas distribution system, according to some embodiments of the present disclosure.

Modern GDSs face some challenges in implementation. To begin with, considerable mechanical and electrical components (e.g., valves, regulators, piping, gas sticks, etc.) may be employed. It can be easy to incorrectly install one or more components of a GDS, which may cause the GDS to behave in a manner that deviates from a planned behavior of the GDS. For example, an incorrect valve or valve type may be installed, a gas line may be incorrectly routed, and so on. Additionally, components of a GDS may wear, degrade, or malfunction. Accordingly, technicians may routinely manually monitor, maintain, and/or replace portions of a GDS.

Malfunctions and degradations within components of a GDS can vary in cause and consequence, and can lead to a number of serious effects both for specific manufacturing processes, and for systems at large. In some cases, gas valves may stick, jam, or otherwise improperly open, close, or regulate, which may disrupt the precision and flow control to achieve the consistency and safety of what may be a delicate manufacturing process. Additionally, valves may be incorrectly installed.

In some cases, root causes for malfunctions of a GDS may be several and/or varied. Additionally, given the complexity of a modern GDS and the number of components in a modern GDS, even once a malfunction is determined it can be difficult and time consuming to identify a source of the malfunction. In one perspective, part wear (e.g., through routine or excessive usage) can reduce the efficacy of GDS components. In other cases, electronic or software malfunctions can disrupt automation, and deliver permanent damage to GDS components. In addition to the above physical damages, disruptions caused by maintenance and remedial work can increase operational costs, impact throughput, reduced product quality, and in some cases introduce safety concerns.

Current methods for inspecting and maintaining GDS components often involve a mixture of manual inspections, regular maintenance schedules, and specialized diagnostic tools and techniques. These traditional methods for inspection, diagnostics and maintenance of GDSs hold some deficiencies. Manual inspections, though thorough, can be time-consuming and costly, and may miss subtle or hidden issues that could blossom into significant issues downstream. Regular maintenance schedules may be based on considerable training for personnel and operators, costly diagnostics tools, and significant down time for manufacturing systems. Additionally, an inherent reliance on human judgment within such methods introduces the perennial risk of human error, potentially resulting in overlooked issues or misdiagnoses.

Embodiments described herein are directed to a GDS and methods for performing diagnostics on a GDS that include automated diagnostics capabilities for monitoring component integrity, identifying when, and in what location, an irregularity (e.g., such as component degradation, malfunction, valve sticking, etc.) has occurred. In some embodiments, the methods and systems of the present disclosure give active, real-time feedback during the manufacturing process and/or between runs of the manufacturing process, which can be used to quickly (e.g., within minutes) determine whether a system irregularity associated with a gas stick assembly, valve, or flow conduit has occurred within a specific flow path. In embodiments, the techniques described herein may be applied after a GDS is installed or modified to ensure that the GDS has been installed correctly. In embodiments, the techniques described herein may be applied periodically (e.g., according to a maintenance schedule) to determine whether functionality of any portion of the GDS has degraded over time. The methods and systems described herein reduce system maintenance time by providing early and automated detection of such irregularities indicative of component degradation, incorrect assembly and/or malfunction. Through such early detections, avoidance of unnecessary maintenance or replacement of a part may be accomplished. Additionally, embodiments enable an automated technique for determining whether or not all gas flows are correct, which makes sure film properties are consistent, and so on. Such automated techniques reduce an amount of time that it ordinarily takes for a technician to manually determine whether gas flows are correct, and in a more accurate manner.

In some embodiments, described herein is a monitoring system that includes a method for selectively isolating flow paths, and monitoring gas pressures and flows at multiple locations (e.g., a manufacturing chamber, a semiconductor processing chamber, an exhaust foreline, etc.) to compare against "base measurements" that indicate a theoretical normal performance of the system. Based on deviations, or the level of deviation, of the real-time measurements from the base measurements, such a monitoring system may automatically determine whether an irregularity (e.g., a malfunction) has occurred.

Furthermore, once such an irregularity has been identified within a flow path, the monitoring system may perform further processing to identify a location of the irregularity within that flow path. The monitoring system may accomplish such by selectively opening and closing groups of valves downstream and/or upstream of one or more pressure sensors and/or flow sensors (e.g., such as a mass flow controller (MFC), one or more pressure transducers and/or other one or more other sensors), and measuring pressure changes and/or flow which the system can process to estimate a general location of the detected irregularity.

In some embodiments, a manufacturing chamber may include one or more inputs that permit gasses to flow into the processing chamber and/or one or more outputs that permit gasses to flow out of the processing chamber (also referred to as a manufacturing chamber). In embodiments, one or more gas stick assemblies may be connected to the manufacturing chamber, each of which may deliver a different gas or gasses to the manufacturing chamber. The system may include a controller or processing device that automatically implements the gas leak techniques described herein.

The methods of the present disclosure are advantageous over prior methods of gas flow path checking, troubleshooting and/or maintenance on processing chambers, gas panels and/or gas stick assemblies because the gas flow path checking, troubleshooting, etc. may be performed without shutting down the processing chamber in embodiments. In fact, in embodiments the method for troubleshooting a gas flow path can be performed between running processes on the processing chamber (e.g., to deposit and/or etch a layer on a substrate) without having to pump out the gas inside the gas stick and/or without upsetting a vacuum environment within the processing chamber in embodiments. Another advantage to this method in embodiments is that each gas stick assembly can be checked simultaneously or in parallel. In contrast, conventional techniques for troubleshooting gas flow paths are performed manually and cannot identify which gas stick assembly in a gas panel is malfunctioning or incorrectly installed, or identify what possible valves or other components in the gas stick assembly may be otherwise malfunctioning.

Aspects of the present disclosure result in technological advantages compared to conventional solutions. The present disclosure in embodiments results in a more efficient substrate manufacturing process, wherein gas flow paths may be prevented and/or detected early. The present disclosure in embodiments provides improved and automated techniques for identifying malfunctions in a GDS and for identifying locations of the malfunctions. If an incorrect or erroneous gas flow path is detected in a manufacturing chamber, wasted material, exposure to toxic/non-toxic gas, wear of the manufacturing chamber components, and so on may be prevented.

FIG. 1 illustrates a system capable of detecting a malfunction within a gas distribution system, according to some embodiments of the present disclosure.

In some embodiments, FIG. 1 can include a gas distribution system platform 130, for hosting modules and generally controlling aspect of a gas distribution system (GDS) 140. GDS 140 may include a gas panel 142, processing chambers 146 and/or a vacuum system 150. In embodiments, a client device 110 may be associated with the system. Client device 110 may enable user-inputs for controlling aspects of the GDS, for receiving reports and/or diagnostics information about the GDS, and so on. In some embodiments, client device 110, GDS platform 130, and/or GDS system 140 may be connected and interface with each other via a network 101.

In some embodiments, the system 100 may include a client device 110, for providing and receiving inputs and outputs to and from an agent using the system (e.g., one that is performing maintenance, inspecting the system, etc.). In some embodiments, the client device 110 can include a user interface (UI) 112 for displaying information to a user, a client application 114 for interfacing with the gas distribution system platform, and input features 116, which may be any standard input features associated with a client device (e.g., a mouse and keyboard).

Figure 2A:
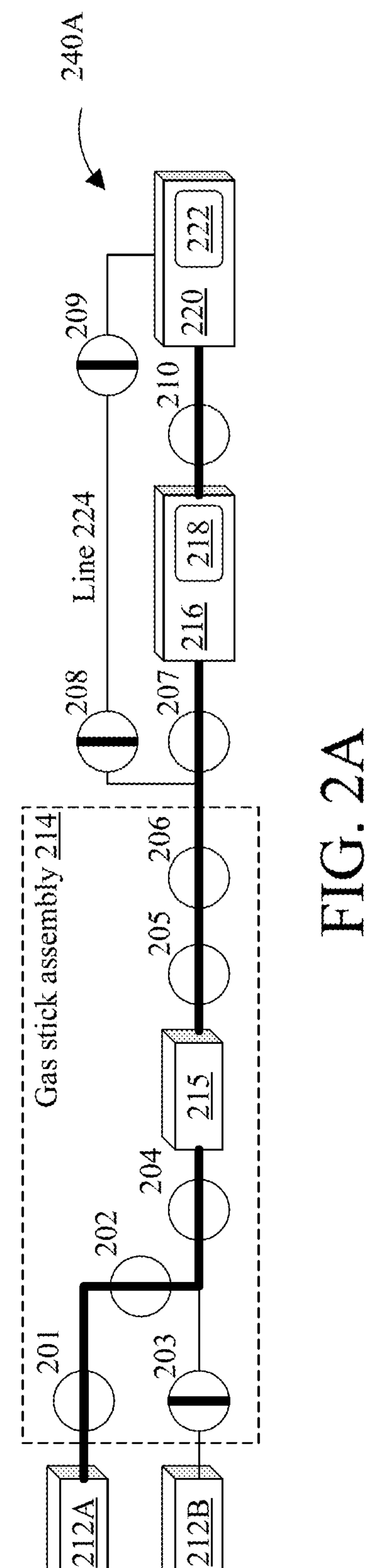
FIG. 2A illustrates a first example flow path of a gas distribution system, according to some embodiments of the present disclosure.
Figure 2B:
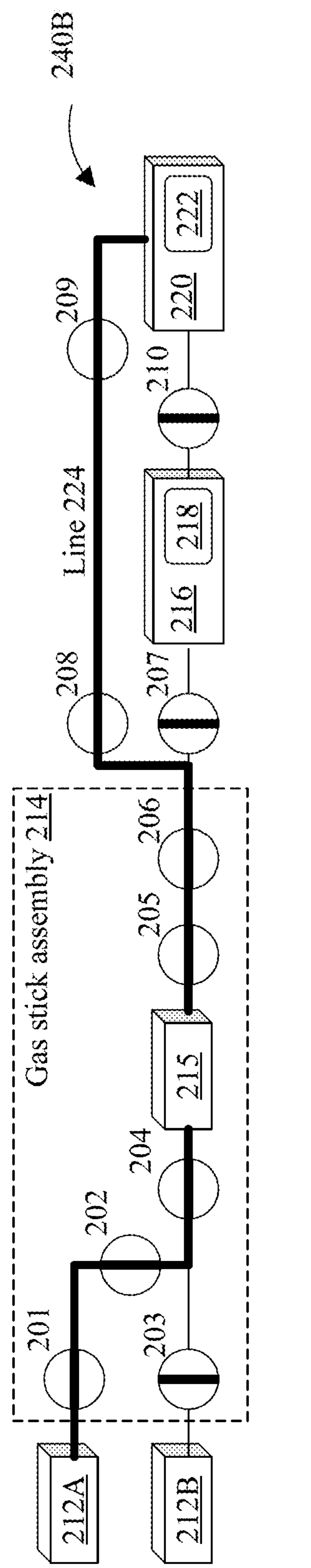
FIG. 2B illustrates a second example flow path of a gas distribution system, according to some embodiments of the present disclosure.
Figures 2C, 2D, 2E:
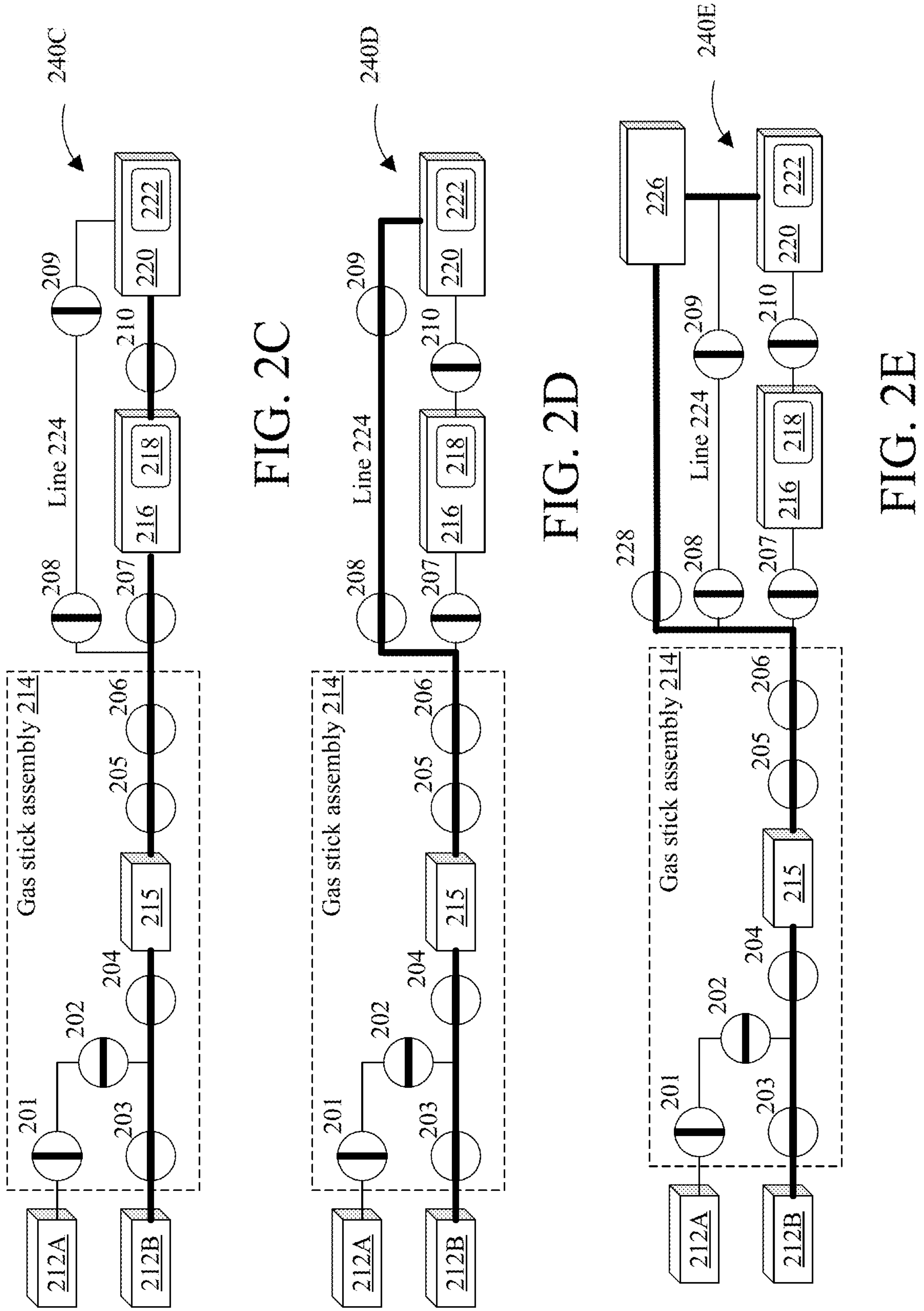
FIG. 2C illustrates a third example flow path of a gas distribution system, according to some embodiments of the present disclosure.
FIG. 2D illustrates a fourth example flow path of a gas distribution system, according to some embodiments of the present disclosure.
FIG. 2E illustrates a fifth example flow path of a gas distribution system, according to some embodiments of the present disclosure.

In some embodiments, GDS platform 130 may include a platform control module 132, for interacting with, transmitting or receiving data to/from, and/or controlling other modules of the platform. Platform control module 132 may also be used for interacting with, transmitting or receiving data to/from, and/or controlling other modules and platforms of the system 100 (or external to the system). Platform control module 132 may manage the GDS control module 134, which may control, engage, or disengage, or generally distribute outputs to components of the GDS system (e.g., valves, regulators, heaters, fans, pumps, vents, etc.). GDS control module 134 may additionally send and receive information to/from sensor module 136, which may receive data from system sensors, and screening module 138, which may enable an automated monitoring process for checking GDS component health and detecting irregularities (as will be further discussed with respect to FIGS. 2A-3).

An example GDS 140 is presented in FIG. 1 to demonstrate a simple embodiment of a GDS that might be controlled by platform 130 and associated modules, and associated gas flow components and systems. In some embodiments, GDS 140 can include a gas panel 142 including one or more source gasses 142A-N and gas sticks 144A-N, processing chambers 146, divert lines 148, and a vacuum system 150, which will be described in further detail below. One of ordinary skill in the art, having the benefit of this disclosure, will appreciate that many configurations of such a GDS, including GDS components, sensors, valves, chambers, etc. might be controlled by platform 130.

Gas panel 142 may be the source for a variety of gasses within the GDS, and may include gas sources 142A-N and gas sticks 144A-N. Gas sticks 144A-N may connect gas sources 142A-N to chambers 146 and/or divert lines 148. In some embodiments, any configuration of gas sticks 144A-N may be attached to any number of gas sources 142A-N. For example, gas stick 144A may be fluidly coupled to one, two, or any number of gas sources 142A-N, and so introduce any one of such gasses into the GDS.

In some embodiments, gas sources 142A-N of the GDS may hold and deliver a variety of gas types to the GDS. In some embodiments, gas sources, depending on the application, can include compressed gas cylinders, gas generators, bulk liquid systems, any other such or similar manner of housing a gas that may be used within a GDS. In some embodiments, these sources can contain and provide the raw material for the entire gas distribution system. Such sources may include sensors, monitors, and regulators for maintaining the integrity of the containment systems and gasses.

The types of gasses sourced from gas sources 142A-N and employed in the GDS may vary widely. In some embodiments, gas sources may hold inert gasses (e.g., nitrogen, argon or other gasses of similar composition or function), that may be employed due to their non-reactive nature. Nitrogen, for example, may be housed within a gas source, and be used to purge a process chamber of other gasses or materials (e.g., oxygen gas, and moisture or organics). In another example, Argon, being heavier than air, may be used to provide an inert blanket within a chamber or space, preventing oxidation and other chemical reactions during manufacturing processes within the chamber. In some embodiments, a gas source 142N may house a reactive gas (e.g., oxygen, fluorine, or other gasses of similar composition or function), that may be deployed by the system to implement a chemical reaction. In the example of oxygen, such a gas may be used to facilitate a combustion process, oxidation process, etc. within a processing chamber. A further reactive gas, chlorine, might be used for etching. Fluorine, Ammonia, or other reactive gasses including halogen-containing gasses, such as $C_2F_6$, $SF_6$, $SiCl_4$, HBr, $NF_3$, $CF_4$, $CHF_3$, $F_2$, $Cl_2$, $CCl_4$, $BCl_3$, and $SiF_4$, among others, and other gasses such as $O_2$ or $N_2O$ may be housed in gas sources 142A-N and deployed by the GDS. Examples of carrier gasses include $N_2$, He, Ar and other gasses inert to process gasses (e.g., non-reactive gasses). In some embodiments, other gasses, such as dopant gasses or other specialty gasses may be included as well.

One of ordinary skill in the art, having the benefit of this disclosure, will appreciate the breadth and magnitude of such inert, reactive, process and/or specialty gasses, and understand the above listing is non-exhaustive. Thus, the gasses used in the GDS provide the means to perform a wide variety of operations ranging from purging, cleaning, deposition, and other processing within a chamber of chambers 146 (or other similar space). The gases may also be used for performing operations that do not involve process chambers. For example, some gases may not flow to a chamber. Gas flow paths for such gases that do not include a process chamber in the gas flow path may also be tested in embodiments.

In some embodiments, gas sticks 144A-N may be assemblies that include multiple control and sensor components that introduce, measure, and/or regulate the flow of gas in the GDS. Such assemblies will be further described with respect to FIGS. 2A-E, suffice to say now, that gas sticks 144A-N introduce gas into the GDS from gas sources 142A-N, and control the flow of gasses to one or more downstream components, such as chambers 146 and/or divert lines 148. In embodiments, gas sticks 144A-N may include one or more pressure sensors and/or flow sensors (e.g., such as a mass flow controller (MFC), and one or more pressure transducers and/or other one or more other sensors), to measure flow of gas through the gas sticks 144A-N.

In some embodiments, gas sticks 144A-N and gas sources 142A-N may be fluidly connected via a variety of valves and conduits. By way of example, flow control valves and shut-off valves within the GDS (e.g., within the gas sticks 144A-N) can include any type of valve that may be used within a GDS, including at least ball valves, gate valves, globe valves, butterfly valves, diaphragm valves, plug valves, pressure relief valves, solenoid valves, fast switching valves, or any such or similar valve commonly used within a GDS. By way of example, conduit connecting components of the GDS can include metal conduits (e.g., steel or ductile iron piping), polymer conduits (e.g., polyvinyl chloride (PVC) pipes, polyethylene (PE) pipes, etc.), or any combination of such or similar kinds of conduits capable of delivering gas flow within a GDS.

As described above, the gas panel 142 provides process and/or cleaning gasses to the further components and/or chambers of the GDS system. In some embodiments, gas from gas panel 142 can be deployed to processing chambers 146A-N, or divert lines 148A-N, or any other types of processing components not shown that may be used within a GDS. In some embodiments, gas panel 142 includes multiple gas sticks 144A-N.

In some embodiments, processing chambers 146A-N may be used to effect a purge, a clean, a reactive process (e.g., an etch or deposition process), or any other type of manufacturing process associated with a processing chamber. By way of example, in some embodiments, processing chamber 146A-N may include chambers used for chemical vapor deposition (CVD), etching chambers, epitaxial chambers, furnace chambers, atomic layer deposition (ALD) chambers, physical vapor deposition (PVD) chambers, sputter deposition chambers, oxidation chambers, annealing chambers, vacuum chambers, chambers for plasma processing, or any other type of such or similar processing chambers that make use of a GDS.

In some embodiments, chambers 146A-N may deploy process or cleaning gasses to an interior volume of the chamber through a showerhead (or in some cases, through a lid and nozzle, etc.). In some embodiments, further chamber components of chambers 146A-N may include a substrate support assembly, an electrostatic chuck, a ring (e.g., a process kit ring), a chamber wall, a base, a showerhead, a gas distribution plate, a liner, a liner kit, a shield, a plasma screen, a flow equalizer, a cooling base, a chamber viewport, a chamber lid, a nozzle and so on and so forth.

In some embodiments, chambers 146A-N may further include exhaust ports to fluidly connect the interior volume of a chamber to the vacuum system 150, which may include a foreline 152A-N and/or one or more vacuum sources 152A-N.

In some embodiments, the GDS 140 may include a series of divert lines 148A-N, for bypassing (e.g., circumventing) the processing chambers 146A-N, and delivering gasses directly from the gas panel to the vacuum system 150.

In some embodiments, chambers 146A-N and divert lines 148A-N may connect to vacuum system 150. Vacuum system 150 may include series of forelines 152A-N that collect and deliver pressure from one or more chambers and divert lines. For example, both a chamber and a divert line may connect to a single foreline, and be used to exhaust, or pump gas, from the GDS.

GDS 140 may include one or more vacuum source(s) 152A-N (e.g., gas pumps) to exhaust gas, and regulate the pressure of chambers and components of the system. In some embodiments, different types of vacuums source(s) (e.g., pumps) may be used, such as diaphragm pumps, rotary vane pumps, etc., or any combination of such or similar pumps commonly used within a GDS. The vacuum system 150 may pump exhaust gasses to an abatement system, which may neutralize gasses, burn off gasses, and so on.

Figure 2F:
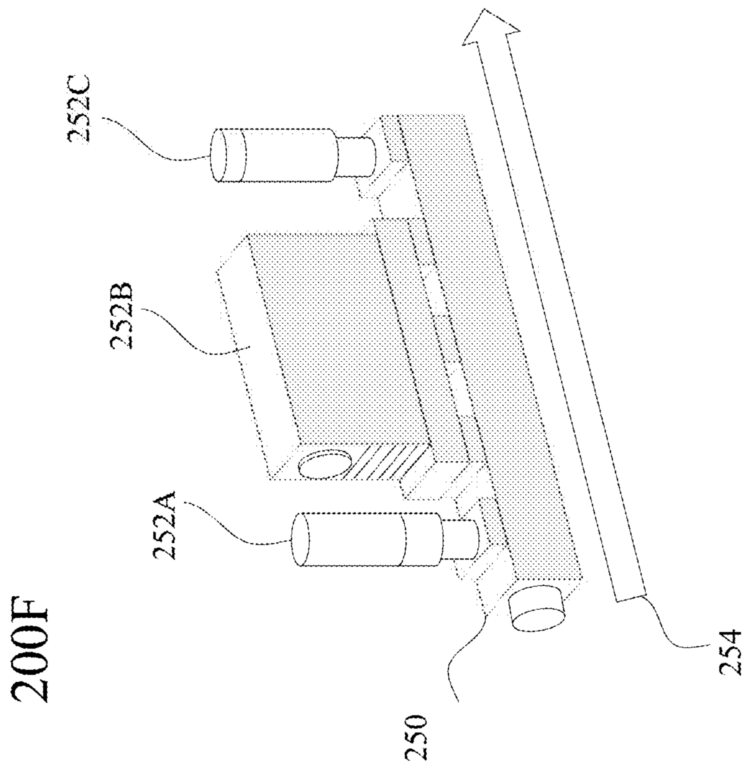
FIG. 2F illustrates an example gas stick assembly of a gas distribution system, according to some embodiments of the present disclosure.

Turning now to FIG. 2A-F, which will be described together, FIGS. 2A-E illustrate example flow paths of a gas distribution system, according to some embodiments of the present disclosure. FIG. 2F illustrates an example gas stick assembly of a gas distribution system, according to some embodiments of the present disclosure.

FIGS. 2A-E illustrate flow paths 240A-E, representing five unique flow paths through a single example flow network (e.g., portion of a gas distribution system). In embodiments, the flow network is associated with a gas stick assembly of a gas distribution system. In some embodiments, each gas stick assembly of the GDS can be associated with a unique flow network. In other embodiments, a single gas stick assembly may be associated with more than one flow network.

The example flow network of FIGS. 2A-E can include one or more conduits, valves, and/or components associated with all possible flow paths associated with gas stick assembly 214. As seen in FIGS. 2A-E, the example flow network can include valves 201-210, component group 215, sensors 218 and 222, processing chambers 216, divert line 224, and foreline 220. Foreline 220 may connect to a system vacuum source (not shown). In the example given, an individual flow path through the example flow network (e.g., flow path 240A of FIG. 2A, flow path 240B of FIG. 2B, flow path 240C of FIG. 2C, flow path 240D of FIG. 2D, and flow path 240E of FIG. 2E) can begin from a gas source 212A or 212B, pass through gas stick assembly 214, and continue downstream to chamber 216 or divert line 224, and foreline 220. In one embodiment, gas source 212A is a gas source for a purge gas and gas source 212B is a gas source for a process gas.

Within respect to FIG. 2F, example gas stick assembly portion 200F illustrates an example portion of a gas stick assembly of a gas distribution system. Portion 200F may correspond to, or be similar to, gas stick assembly 214 of FIGS. 2A-E. Gas stick assembly 214 may include components described herein that are not shown in FIGS. 2A-E.

Gas stick assembly portion 200F may include a component group including a mass flow controller 252B, and additional sensors 252A and 252C (e.g., pressure transducers), valves (not shown), etc. mounted onto the body of a gas stick (e.g., gas stick body 250). In some embodiments, gas stick assembly portion 200F may be a portion of a larger gas stick assembly that may include more components (e.g., sensors, controllers, valves, etc.), and facilitate gas flow in the direction of arrow 254.

In some embodiments, such a larger gas stick assembly may extend in either direction to accommodate more components. For example, portion 200F might be part of a larger gas stick assembly that may include a hybrid manual/automatic valve, a purge valve for introducing the purge gas to the gas stick, one or more flow regulators, one or more filters or purifiers, or one or more mass flow controllers, one or more other valves, or any other kinds of components commonly used within gas stick assemblies.

In some embodiments, gas stick assembly portion 200F can correspond to, or be similar to, the portion of the gas stick assembly 214 that includes the component group 215. In some embodiments, MFC 252B and sensors 252A and 252C may correspond to, or be similar to, components within component group 215. In some embodiments, components of both gas stick assembly 214 and gas stick assembly portion 200F may be similar, or analogous, to similar components previously recited and described with respect to FIG. 1. In some embodiments, other components (e.g., including gas sources, sensors, valves, conduits, chambers, forelines, vacuum source(s), etc.) of FIGS. 2A-F, may also be similar or analogous to components previously with respect to FIG. 1. In some embodiments, such similar components of FIG. 2A-F may incorporate and augment at least the disclosure and embodiments provided with respect to FIG. 1.

Returning to FIGS. 2A-E, FIGS. 2A-E illustrate four flow paths 240A-E through the example flow network. The example flow network may include two gas sources 212A and 212B that may be coupled to gas stick assembly 214. In one embodiment, gas stick assembly 214 can include two entry flow paths, one corresponding to each gas source, and include valves 201-203 for controlling input flow from the gas sources. In other embodiments, gas stick assembly 214 may include other numbers of valves and/or other components, may be connected to greater or fewer gas sources, may be connected to additional processing chambers and/or divert lines, and so on.

In some embodiments, source 212A may be a purge gas source, and valve 202 may be referred to as a "purge valve." In some embodiments, source 212B may be an inert gas source or a process gas source. In some embodiments, valves 201-203 (or valves 201-204) may be included in an upstream portion (or first portion) of the gas stick assembly 214 that is upstream of component group 215 may be referred to as "upstream valves," or "input valves"

Downstream of the gas input, gas stick assembly 214 may include valves 204, 205, 206, and a component group 215. In some embodiments, a downstream or second portion of the gas stick assembly may include valves (e.g., valves 205, 206, 207, 208, 209, etc.) that are downstream of component group 215. In some embodiments, valves 201-206 of the gas stick assembly (and further valves of the flow network, 207-210 may be any kinds of valves capable of opening and closing to enable or disable flow (e.g., any such type of valves as were previously described with respect to FIG. 1). In some embodiments, the described valves may partially open or close, to partially enable, and partially restrict flow. In some embodiments, valves have open or closed positions. In some embodiments, valves include many different opened positions (e.g., flapper positions between 0 degrees and 90 degrees), each of which may provide a different conductance for gas flow.

In some embodiments, component group 215 may be one or more pressure sensors and/or flow sensors or controllers (e.g., such as a mass flow controller (MFC), one or more pressure transducers and/or other one or more other sensors), and include any kind of MFC capable of measuring and controlling the gas flow rate. In some embodiments, component group 215 may further measure the pressure within the portion of the gas stick on which the component group is attached. The component group 215 of the present disclosure may include a pressure sensor, a heating element, a temperature sensor, a controller (e.g., a processing device) and/or a variable or proportional valve that can control an amount of gas that flows through the mass flow controller based on instructions from a controller of the component group.

In some embodiments, an embodiment of a gas stick assembly (e.g., gas stick assembly 214 and gas stick assembly portion 200F) may include a rigid section of piping, with valves, regulators, and/or other control mechanisms mounted thereto. Such a configuration, or stick assembly, may facilitate measurement and control of gas flow, pressure, and direction, and provide accuracy and precision due to the proximal nature of the components. Such a gas stick assembly may be a part of any of the system components. Such a gas stick assembly may be modular in design, and allow for adaptability, maintenance, and part replacement, according to system specifications.

In some embodiments, such a gas stick assembly may introduce gas from gas sources 212A and 212B to downstream components, such as chamber 216, divert line 224, foreline 220, and vacuum source 230. Such components may be any type of components as were previously described with respect to FIG. 1.

Downstream of gas stick assembly 214, the flow network may include valves 207-210. As will be discussed below, valves 207-210 may be manipulated to alter the flow paths through the flow network. In some embodiments, one or more of valves 207-210 are valves of the gas stick assembly 214. Valves 207-210 may be any kinds of valves capable of opening and closing to enable or disable flow (e.g., any such type of valves as were previously described above with respect to FIG. 1) completely or partially. In some embodiments, valves 209 and 210 may be referred to as "isolation valves." In some embodiments, valve 208 may be referred to as a "lid divert" valve.

In some embodiments, chamber 216 and foreline 220 may further include sensors 218 and 222. In some embodiments, such sensors may be pressure sensors, capable of measuring the pressure level within the chamber 216 and foreline 220. In some embodiments, sensors 218 and 222 may be manometer pressure sensors, bourdon tube pressure sensors, diaphragm pressure sensors, capacitive pressure sensors, optical pressure sensors, thermal pressure sensors, or any other such or similar, or combination of such of similar pressure sensors commonly used within GDSs.

In some embodiments (as will be further discussed with respect to FIG. 3), pressure sensors 218 and 222 (as well as component group 215) may be capable of measuring pressure (and flow rate) during a period of time prior to gas flow enablement, during a transition period of time when gas flow is being enabled, and during a period of time after gas flow has stabilized, or has been enabled. In embodiments, such sensors can generate data regardless of whether gas flow is flowing through a flow path of the flow network that includes the pressure sensor (e.g., in the case of sensor 218, sensor 218 can continue to generate pressure data even when valve 208 is closed, and/or when gas flowing through divert line 224 and not through chamber 216).

In some embodiments, the components and systems of the gas stick assembly 214 and associated flow network can be varied. For example, in some embodiments, more than two gas sources (including any number of gas sources, including only one source) may source gas to the gas stick assembly. In some embodiments, gas stick assembly 214 may include more (or fewer), valves, sensors, or regulators, or any further configurations, flow paths, and sequences of such. In some embodiments, additional chambers, divert lines, forelines, and requisite valves and sensors may be added.

In some embodiments, a flow network associated with a gas stick assembly 214 can include any number of unique flow paths that can be opened or closed. In some embodiments, while one flow path is open, all others may be closed.

In the embodiment seen in FIGS. 2A-E, five unique flow paths 240A-E can be seen. Flow path 240A can include a flow path for gas flow from gas source 212A, to valve 201, to valve 202, to valve 204, through component group 215, through valves 205 and 206, through valve 207, through chamber 216, through valve 210, and through foreline 220, and on to a vacuum source. Flow path 240B can include a flow path for gas flow from gas source 212A, to valve 201, to valve 202, to valve 204, through component group 215, through valves 205 and 206, through valve 208, through divert line 224, through valve 209, foreline 220 and onto a vacuum source. Flow path 240C can include a flow path for gas flow from gas source 212B, to valves 203 and 204, through component group 215, through valves 205 and 206, through valve 207, through chamber 216, through valve 210, and through foreline 220 and onto a vacuum source. Flow path 240D can include a flow path for gas flow from gas source 212B, to valves 203 and 204, through component group 215, through valves 205 and 206, through valve 208, through divert line 224, through valve 209, through foreline 220 and onto a vacuum source. Flow path 240E can include a flow path for gas flow from gas source 212B, to valves 203 and 204, through component group 215, through valves 205 and 206, through valve 228, additional process components 226 (which may be additional processing chambers, divert lines, or any other components of a GDS, including the appropriate valves and sensors mutatis mutandis), and through foreline 220 and onto a vacuum source.

In some embodiments, unique flow paths of the flow network associated with a gas stick assembly 214 can be engaged or disengaged through operation of specific valve sequences. For example, with respect to unique flow path 240A, valves 201 and 202 may be opened, while valve 203 may be shut, thus enabling flow from gas source 212A through gas stick assembly 214. Furthermore, valves 208 and 209 may be shut, and valves 208 and 210 may be open, directing gas flow through chamber 216. In a similar manner, for additional flow paths 240B-E (and as seen in FIGS. 2A-E) all valves along a flow path may be open (fully or partially), while all valves not along the flow path may be closed.

Thus, unique valve open and close configurations can be used to enable or disable gas flow through any of the unique flow paths associated with a flow network of a gas stick assembly 214. Furthermore, such configurations may be monitored, stored, operated, and updated within a GDS control system (e.g., such as GDS control module 134 as seen in FIG. 1)

Although the flow network includes two unique flow paths from the gas stick assembly 214 to the vacuum source 230 (one through the chamber 216, and one through the divert line 224), and four unique flow paths through the flow network generally (if measuring a flow path from a gas source, through the gas stick, and to vacuum source 230), one or ordinary skill in the art will appreciate that with the inclusion of additional chambers, divert lines, etc., many more (or in some cases less) unique flow paths can exist within many different embodiments or configurations of flow networks that may be associated with a gas stick assembly.

Furthermore, a single GDS may include many such gas stick assemblies and associated flow networks, such as was illustrated in FIG. 1. These many gas stick assemblies may be tested in series or in parallel according to embodiments described herein.

Figure 3:
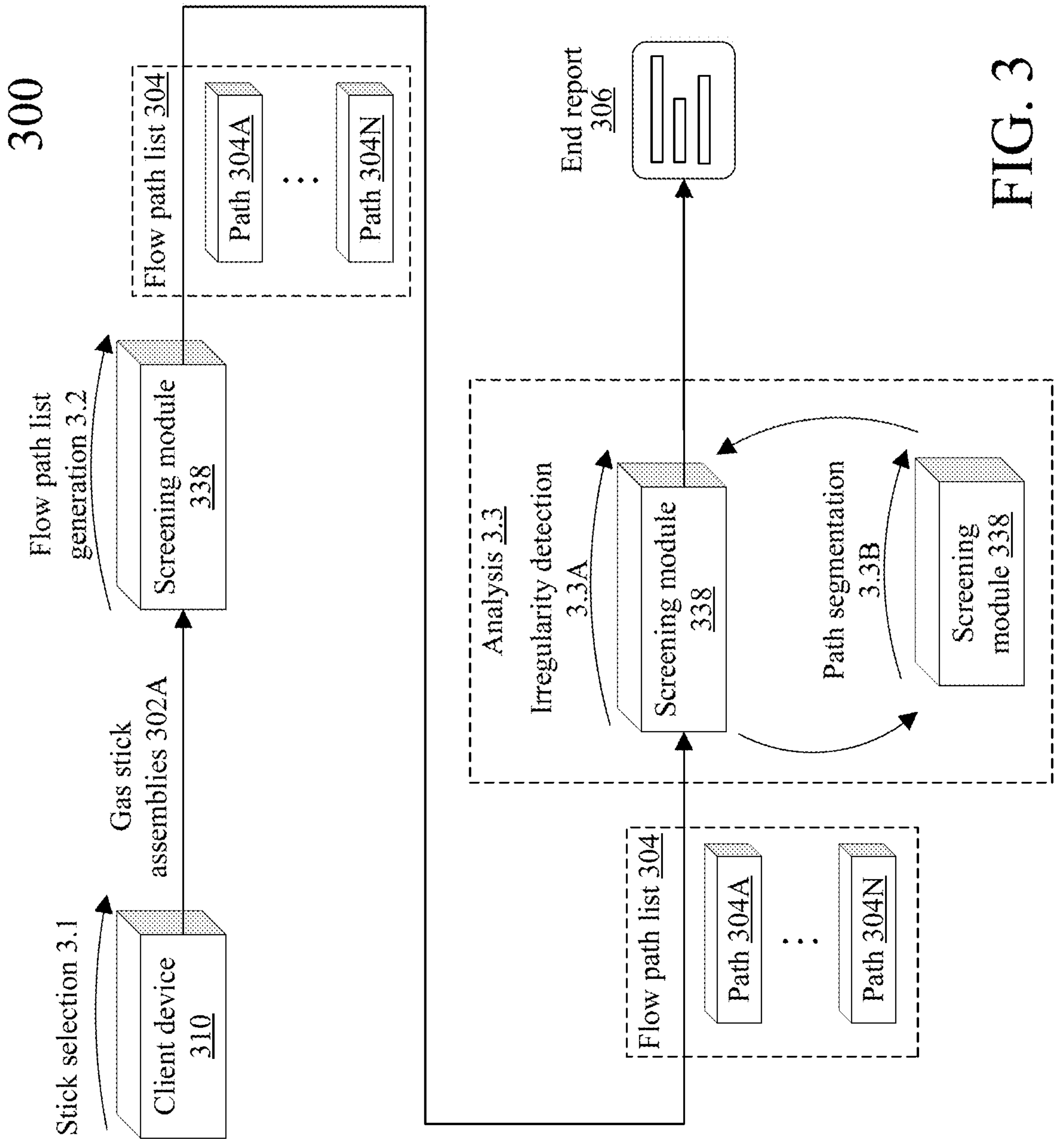
FIG. 3 illustrates an example process for detecting a malfunction within a gas distribution system, according to some embodiments of the present disclosure.

Turning now to FIG. 3, FIG. 3 illustrates an example method for monitoring component health within and/or testing the gas distribution system, according to some embodiments of the present disclosure.

Process 300 of FIG. 3 may be facilitated with screening module 338 and client device 310, which may be similar or analogous to screening module 138 and client device 110 as were described with respect to FIG. 1, and incorporate at least the embodiments described therein. Furthermore, in the following disclosure, the components, systems, and descriptions of FIGS. 2A-F will be specifically referenced to aid in the explanation of process 300. Such a description is solely in the furtherance of clarity and understanding, and process 300 should not be understood as solely applying to the embodiments of a GDS seen in FIGS. 2A-F. Furthermore, process 300 should be understood to be applicable to any versions or embodiments of, different systems, components, and configurations associated with a GDS.

Process 300 can begin at operation 3.1, in which a client device may be used to select which portions of a GDS (e.g., which gas stick assemblies 302A), for the process to perform screening or monitoring of. In some embodiments, operation 3.1 may be skipped and an automated testing sequence may be applied by screening module 338 without input from client device 310. In some embodiments (as was discussed previously with respect to embodiments of a GDS seen in FIGS. 1 and 2A-F), a GDS may include multiple gas stick assemblies, and each gas stick assembly may introduce one or more gasses to a flow network associated with the gas stick assembly. As such, a client device 310 may be used to select which assemblies (and associated flow networks) of the GDS to screen.

At operation 3.2, the screening module 338 may generate a list of the flow paths 304 including all unique flow paths 304A-N associated with flow networks of each gas stick assembly to be tested. As was discussed with respect to FIGS. 2A-F, screening module 338, or other associated modules of an associated control system, may store the number of unique flow paths associated with each flow network of each gas stick assembly. Furthermore, such a control system may include the specific valve configurations (and the ability) to enable, or disable, gas flows through any such unique flow path.

In a specific example referencing FIGS. 2A-D, if the client device were to transmit a list of gas stick assemblies 302A including the gas stick assembly 214, operation 3.2 could generate four unique flow paths (e.g., flow paths 240A-D) that would be included in flow path list 304A-N. In a similar manner, all unique flow paths of all indicated flow networks of all indicated gas stick assemblies can be compiled by screening module 338 into flow path list 304.

At operation 3.3, analysis of each flow path can be performed. Analysis 3.3 can include two components, irregularity detection 3.3A and path segmentation 3.3B, that can be performed for each flow path within flow path list 304. Irregularity detection 3.3A may include processing on a unique flow path to detect any irregularities in the unique flow path. Irregularities can include a variety of features, including valve malfunctions, flow conduit malfunctions, software misconfigurations, etc. Path segmentation 3.3B may include further processing to determine a location of an irregularity within a unique flow path. In some embodiments, path segmentation 3.3B may be performed if, or in response to, irregularity detection 3.3A detecting an irregularity in a given flow path.

In a specific example referencing FIGS. 2A-D, if the flow path list were to include unique flow paths 240A-D, screening module 338 would sequentially perform irregularity detection of each flow path 240A-D. If an irregularity were detected in any of the flow paths 240A-D, screening module 338 would then perform path segmentation on such flow paths.

To perform irregularity detection for a given flow path, screening module 338 may enable gas flow through a given flow path of a flow network, gather data from sensors and modules associated with the flow network, and compare such data to pre-established "baseline" data. Variations and deviations from the collected data and the baseline data can then be used to determine if the flow path includes an irregularity.

In a specific example referencing FIGS. 2A-D, if the flow path list were to include unique flow path 240A, screening module 338 may begin by enabling gas flow through unique flow path 240A. Before, during, and/or after the enabling of gas flow through unique flow path 240A, screening module 338 might capture pressure data from sensors 218, and sensors 222, as well as flow rate and/or pressure data through component group 215. Thus, data indicative of the pressure and/or flow rate within chamber 216, foreline 220, and/or gas stick assembly 214 might be captured at three different time intervals for each unique flow path: one interval prior to gas enablement, one during a transition period as gas flow reaches an equilibrium, and one after gas flow or pressure has reached equilibrium (e.g., after gas flow has been enabled, or after gas flow has been stopped).

In some embodiments, any such collected data can be compared against a pre-established baseline value. In some embodiments, deviation from baseline values can be determined, and the deviation may be compared against deviation thresholds to determine if an irregularity is present. In some embodiments, a change (at times herein referred to as a "delta") in pressure or flow rate from one, two or more different time intervals can be compared to a threshold. In some embodiments, such thresholds, may be user-set, or machine-generated.

In a specific example referencing unique flow paths 240A-D of FIGS. 2A-D, irregularity detection might be performed on each unique flow path and data comparisons made. For example, if given unique flow paths 240A-D for irregularity detection, screening module 338 might sequentially enable unique flow paths 240A-D, and capture data reflective of pressure within chamber 216, foreline 220, and gas stick assembly portion including one or more pressure sensors and/or flow sensors of group 215 (e.g., which may include an MFC, one or more pressure transducers, etc.) for each of the flow paths 240A-D. In some embodiments, screening module 338 may capture gas flow rate data from the one or more pressure sensors and/or flow sensors of group 215 as well.

In some embodiments, such data might include data from the three or four time intervals or time periods discussed above, a first interval or time period before gas flow has been enabled through the flow path 240A, an intermediate interval or time period as gas flow is reaching an equilibrium state, and third interval or time period after gas flow and/or pressure has reached an equilibrium state, and/or a fourth interval or time period after gas flow has stopped. In some embodiments, the delta between data from the first and third interval or time period might be computed by screening module 338 to determine changes in gas stick flow rate, chamber pressure, and foreline pressure, before and after gas flow has been enabled. In some embodiments, data for a single interval or period may be compared to one or more criteria (e.g., thresholds) to determine whether the one or more criteria are satisfied.

In some embodiments, a similar process for gas flow enablement and data capture might be repeated for each unique flow path. In some embodiments, data from a pressure sensor may be collected although it is not in the flow path. For example, in the specific case of flow path 240B, gas flow is directed through divert line 224 rather than chamber 216, and data may be collected and processed. In some embodiments, the deltas might then be compared to thresholds (e.g., pre-established deltas) to indicate and detect irregularities associated with that flow path. Similar tests may be performed for each flow path 240A-D.

A set of thresholds will now be described. One of ordinary skill in the art will appreciate that in some embodiments, such thresholds may apply at the system level, or be unique to each flow path. In some embodiments, such thresholds may be "standard" thresholds for the system or flow path. In some embodiments, such thresholds may correspond to a specific state of the system, or flow path (e.g., such as a flow state). Thresholds for changes, or deltas, in pressure, or flow rate, etc. may be described in absolute terms (e.g., a change or delta of 30 PSI can indicate a change of −30 PSI, or +30 PSI) or percentages.

In the case of flow path 240A, for example, a change in chamber pressure within the range of 0 mT to 200 mT as gas flow is enabled through the flow path may indicate that the flow path 240A includes an irregularity. In other embodiments, a change in chamber pressure within or below the range of 5 mT to 70 T as gas flow is enabled may indicate that the flow path 240A includes an irregularity.

In some embodiments, a change in foreline pressure between 0 mT to 100 mT as gas flow is enabled may indicated that flow path 240A includes an irregularity. In other embodiments, a change in foreline pressure between 5 mT to 70 T as gas flow is enabled may indicated that flow path 240A includes an irregularity.

In the case of flow path 240B, for example, a change in chamber pressure of greater than 200 mT as gas flow is enabled may indicate that the flow path 240B includes an irregularity. In other embodiments, a change in chamber pressure that is above the range 5 mT to 70 T as gas flow is enabled may indicate that the flow path 240B includes an irregularity.

In some embodiments, a change in foreline pressure less than 100 mT (e.g., between 0 mT to 100 mT) as gas flow is enabled may indicated that flow path 240B includes an irregularity. In other embodiments, a change in foreline pressure between 5 mT to 70 T as gas flow is enabled may indicate that the flow path 240B includes an irregularity.

In the case of flow path 240C, for example, a change in chamber pressure between 0 mT to 200 mT as gas flow is enabled may indicate that the flow path 240C includes an irregularity. In other embodiments, a change in chamber pressure between 5 mT to 70 T as gas flow is enabled may indicate that the flow path 240C includes an irregularity.

In some embodiments, a change in foreline pressure between 0 mT to 100 mT as gas flow is enabled may indicated that flow path 240C includes an irregularity. In other embodiments, a change in foreline pressure between 5 mT to 70 T as gas flow is enabled may indicate that the flow path 240C includes an irregularity.

In the case of flow path 240D, for example, a change in chamber pressure of greater than 200 mT as gas flow is enabled may indicate that the flow path 240D includes an irregularity. In other embodiments, a change in chamber pressure that is above the range 5 mT to 70 T as gas flow is enabled may indicate that the flow path 240D includes an irregularity.

In some embodiments, a change in foreline pressure between 0 mT to 100 mT as gas flow is enabled may indicated that flow path 240D includes an irregularity. In other embodiments, a change in foreline pressure between 5 mT to 70 T as gas flow is enabled may indicate that the flow path 240D includes an irregularity.

In some embodiments, the above-described thresholds may apply when flow rate is high or above a flow rate threshold, and such thresholds may be modified if flow rate is diminished. Thus, in some embodiments, the system (or screening module) may first determine whether the flow rate is high (e.g., above a flow rate threshold), or in some other state (e.g., a diminished state or below the flow rate threshold), prior to the chamber pressure and foreline pressure threshold comparisons being made. In some embodiments, different testing criteria or threshold may be associated with different flow rates.

In some embodiments, a gas flow rate through a flow path may correspond to three flow rate states, a fully open state (e.g., when a throttle valve of the flow path is fully open) corresponding to the thresholds described above, a partially open state (e.g., when a throttle valve of the flow path is partially open), and a low flow state (e.g., when a throttle valve of the flow path is partially open and gas flow is less than a defined threshold). Should a partially open state or a low flow state be detected, the above thresholds may be modified.

For example, in some embodiments pertaining to flow paths 240A-D, after gas flow has been enabled, should the flow rate be above 200 standard cubic centimeters per minute (sccms), the fully open state can be identified and the above-described thresholds may be applied. In other embodiments pertaining to flow paths 240A-D, after gas flow has been enabled, should the flow rate be within the range 200 sccms to 50 standard liters per minute (SLM), the fully open state can be identified and the above-described thresholds may be applied.

In another example, in some embodiments pertaining to flow paths 240A-D, after gas flow has been enabled, should the flow rate be within the range 100 sccms to 200 sccms, the partially open state can be identified and the above-described thresholds may be applied. In other embodiments pertaining to flow paths 240A-D, after gas flow has been enabled, should the flow rate be within the range 1 sccms to 10 SLM, the partially open state can be identified and the above-described thresholds may be applied.

In another example, in some embodiments pertaining to flow paths 240A-D, after gas flow has been enabled, should the flow rate be within the range 0 sccms to 100 sccms, the low flow state can be identified and the above-described thresholds may be modified. In other embodiments pertaining to flow paths 240A-D, after gas flow has been enabled, should the flow rate be within the range 1 sccms to 10 SLM, the low flow state can be identified and the above-described thresholds may be modified.

In some embodiments, when a low flow state has been identified, the above-described thresholds may be modified by scaling each above threshold and/or threshold range endpoint to 10% its original value. In some embodiments, when a low flow state has been identified, the above-described thresholds may be modified by scaling each above threshold and/or threshold range endpoint from anywhere between 0.1% to 80% of its original value.

In a non-limiting example taken from the above-described thresholds, with respect to flow path 240A, the flow state can first be identified. If the flow path is in a fully open state, the above-described thresholds may be applied. An irregularity may be detected within flow path 240A if the change in foreline pressure as gas is enabled is between 5 mT to 70 T. However, if a low flow state is detected in flow path 240A, the threshold endpoints may be scaled to 10% their original value. Thus, when the low flow state is identified, an irregularity may be detected within flow path 240 if the change in foreline pressure as gas is enabled is between 0.5 mT to 7 T. In such a way, a scaling factor may be applied to any of the above-described thresholds when the system is in a low flow state.

In some embodiments, the fully open state, partially open state, and a low flow state may correspond to the degrees of which a throttle valve of the flow path is open. In some embodiments, the fully open state may correspond to a fully open throttle valve. In some embodiments, the fully open state may correspond to a throttle valve with a flapper position within a 5 degree to 90 degree position (with 90 degrees being completely open). In some embodiments, the fully open state may correspond to a throttle valve that is anywhere from 5% to 100% open.

In some embodiments, the partially open state may correspond to a partially open throttle valve. In some embodiments, the partially open state may correspond to a throttle valve with a flapper position within a 0 degree to 50 degree position (with 0 degrees being completely closed). In some embodiments, the partially open state may correspond to a throttle valve that is anywhere from 0% to 55% open.

In some embodiments, the low flow state may correspond to a partially open, or mostly closed, throttle valve. In some embodiments, the low flow state may correspond to a throttle valve with a flapper position within a 0 degree to 50 degree position (with 0 degrees being completely closed). In some embodiments, the low flow state may correspond to a throttle valve that is anywhere from 0% to 55% open.

In some embodiments, an unstable gas flow rate after gas flow has been enabled may indicate that flow path 240A includes an irregularity. In some embodiments, an unstable gas flow rate after gas flow has been enabled may indicate that flow path 240B includes an irregularity. In some embodiments, an unstable gas flow rate after gas flow has been enabled may indicate that flow path 240C includes an irregularity. In some embodiments, an unstable gas flow rate after gas flow has been enabled may indicate that flow path 240D includes an irregularity. In any of the above embodiments or flow states, an unstable gas flow rate may be identified by a gas flow rate with a coefficient of variation (CV) above 0.5 (i.e., a relative standard deviation (% RSD) greater than 50%).

In some embodiments, such or similar threshold values (as discussed above with respect to flow path 240A-D) may be applied during irregularity detection of other flow paths. In other embodiments, the threshold values may be unique to each flow path.

In some embodiments, when an irregularity is detected, screening module 338 can perform path segmentation to determine the relative location of the irregularity within a specific flow path. In some embodiments, the relative location of the irregularity with respect to a component group (e.g., an MFC or pressure transducer of a component group) of a given gas stick assembly may be determined.

As an example of such a process, (returning to unique flow paths 240A-D of FIGS. 2A-D), to provide an example of such a process, in a case where each flow path 240A-D is processed by irregularity detection, and only path 240D is detected as including an irregularity, the system may then only perform path segmentation on path 240D.

To perform path segmentation, the screening module 338 may segment the flow path into a first half, upstream of one or more pressure sensors and/or flow sensors (e.g., an MFC and/or pressure transducer) within the gas stick, and a second half, downstream of the one or more pressure sensors and/or flow sensors within the gas stick. The module may then perform a two-part gas flow process including a first (upstream open) phase, and a second (downstream open) phase. In the first phase, the module may open all upstream valves associated with the first half of the flow path and close all downstream valves of the second half of the flow path, while gathering pressure data at the one or more pressure sensors and/or flow sensors within the gas stick. Then, inverting the process in the second phase, the module may close all upstream valves associated with the first half of the flow path and open all downstream valves of the second half of the flow path, while gathering pressure data at the one or more pressure sensors and/or flow sensors within the gas stick.

As discussed above, the collected data for both parts of the gas flow process can include a first time period of when gas has yet to be enabled, a second time period as gas flow has been enabled but has not yet reached an equilibrium state, a third time period after gas flow has reached an equilibrium state, and/or a fourth time period after gas flow has stopped. For each of the phases, and in a similar manner as irregularity detection, the module may compare data deltas to thresholds to determine whether the irregularity is present in the upstream half, or the downstream half of the flow path. In some embodiments, such thresholds, may be user-set, or machine-generated.

In some embodiments, a similar process for processing and data capture might be repeated for each unique flow path that has been identified as including an irregularity. In some embodiments, the deltas might then be compared to thresholds (e.g., pre-established deltas) to determine the relative location of the irregularity.

In a specific example referencing unique flow path 240B of FIGS. 2A-D, path segmentation might be performed and data comparisons made. For example, if an irregularity is found within unique flow paths 240B during irregularity detection, path segmentation may segment path 240B into an upstream and downstream half, based on the location of component group 215, and selectively perform the two-phase gas flow process by first opening all upstream valves (e.g., valves 201, 202, and 204) and closing all downstream valves (e.g., valves 205, 206, 208, 209, and 210) in a first phase, and then inverting the process (closing the upstream valves, opening the downstream valves) in the second phase. In some embodiments, only one phase of the two-part process may be performed.

To determine which phase of the two-phase gas flow process, to enable, the screening module may sample the pressure at component group 215. If the pressure is below 20 PSI, or in other embodiments, within the rang 0 to 40 PSI, the first phase can be initiated. In some embodiments, if the sampled pressure is above 20 PSI, or within or above the range 15 to 120 PSI, in other embodiments, the second phase can be initiated. During either phase, screening module 338 might capture data reflective of pressure within gas stick assembly portion including component group 215. In some embodiments, screening module 338 may capture gas flow rate data from component group 215 as well. In some embodiments, such data might include data from the four time intervals discussed above, a first interval before gas flow has been enabled through the flow path 240B, a second, intermediate interval as gas flow is reaching an equilibrium state, a third interval after gas flow has reached an equilibrium state, and a fourth interval after gas flow has been stopped. In some embodiments, the delta between data from the first and third interval (or fourth interval) might be computed by screening module to determine changes in gas stick flow rate, chamber pressure, and foreline pressure, before and after gas flow has been enabled.

In the case of flow path 240B, for example, a change in pressure at the component group 215 during the first phase of greater than 10 PSI may indicate that the irregularity is located in the downstream half of the flow path. In other embodiments, a change in pressure at the component group 215 during the first phase that is above the range 0 PSI to 80 PSI may indicate that the irregularity is located in the downstream half of the flow path. In some embodiments, a change in pressure at the component group 215 during the first phase that is less than 10 PSI may indicate that the irregularity is located in the upstream half of the flow path. In other embodiments, a change in pressure at the component group 215 during the first phase that is anywhere between 0 PSI to 80 PSI may indicate that the irregularity is located in the upstream half of the flow path.

In the case of flow path 240B, for example, a change in pressure at the component group 215 during the second phase between 0 PSI and 10 PSI may indicate that the irregularity is located in the downstream half of the flow path. In other embodiments, a change in pressure at the component group 215 during the second phase that is anywhere between 0 PSI to 80 PSI may indicate that the irregularity is located in the downstream half of the flow path.

In some embodiments, responsive to a change in pressure at the component group 215 during the second phase of more than 10 PSI the system may repeat the first phase as described above (along with the multiple embodiments for thresholds). In some embodiments, responsive to a change in pressure at the component group 215 during the second phase that is above the range 0 PSI to 80 PSI, the system may repeat the first phase as described above (along with the multiple embodiments for thresholds).

In some embodiments, such or similar threshold values (as discussed above with respect to flow path 240B) may be applied during path segmentation of other flow paths. In other embodiments, the threshold values may be unique to each flow path.

In such a way, and for the multiple flow paths in flow path list 304, path segmentation can be performed in response to a detected irregularity.

At the conclusion of process 300, screening module 338 may output a report 306 indicative of any irregularities that were found with respect to any of the gas stick assemblies and associated flow networks and flow paths. The report may further contain a relative location of the irregularity within a given flow path. Further maintenance and inspection can then be performed as required.

Figure 4A:
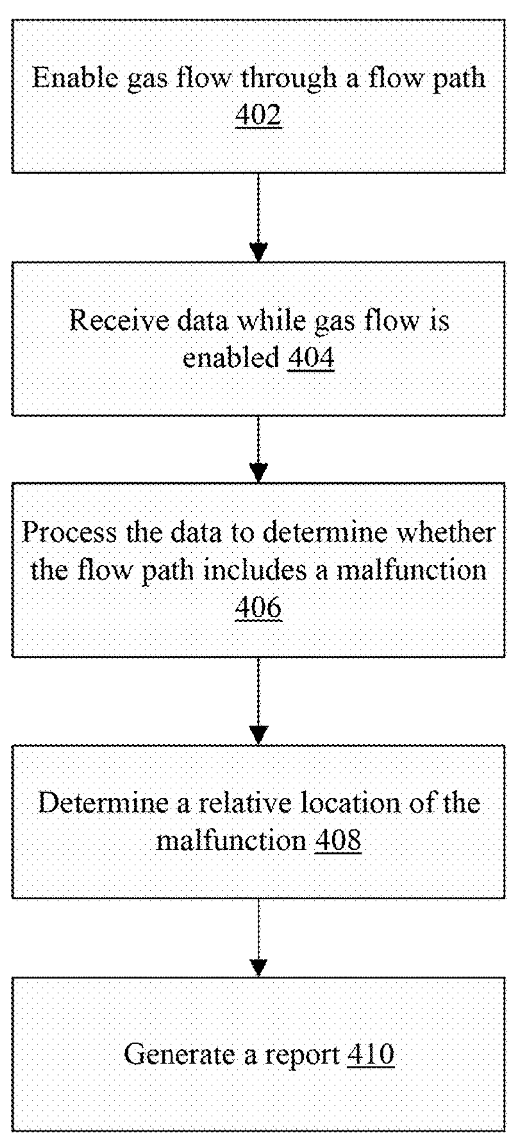
FIG. 4A illustrates a flow chart of method for detecting a malfunction within a gas distribution system, according to some embodiments of the present disclosure.

FIG. 4A illustrates a flow chart of a method 400 for detecting a malfunction within a gas distribution system, according to some embodiments of the present disclosure.

Method 400 may be performed by processing logic that can include hardware (circuitry, dedicated logic, etc.), software (e.g., instructions run on a processing device), or a combination thereof. In one implementation, some, or all of the operations of method 400 can be performed by one or more components of system 100 of FIG. 1.

At block 402, processing logic can enable gas flow through a flow path. In some embodiments, processing logic can enable, by a controller, gas flow through a first flow path of the gas distribution system.

At block 404, processing logic can receive data while gas flow is enabled. In some embodiments, processing logic can receive first data including at least one of first pressure data or first flow rate data associated with the first flow path of the gas distribution system while gas flow is enabled through the first flow path. Pressure data and/or flow data may also be collected during gas flow and/or after gas flow has stopped.

At block 406, processing logic can process the data to determine whether the flow path includes a malfunction. In some embodiments, processing logic can process the data to determine whether the flow path of the gas distribution system includes a malfunction.

At block 408, processing logic can determine a relative location of the malfunction. In some embodiments, processing logic can (in response to determining that the first flow path comprises a malfunction), determine a relative location of the malfunction within the first flow path, with respect to at least one of a pressure sensor or a flow sensor within the first flow path.

At block 410, processing logic can generate a report. In some embodiments, processing logic can generate a report indicating whether the flow path comprises a malfunction and a relative location of any determined malfunction.

Figure 4B:
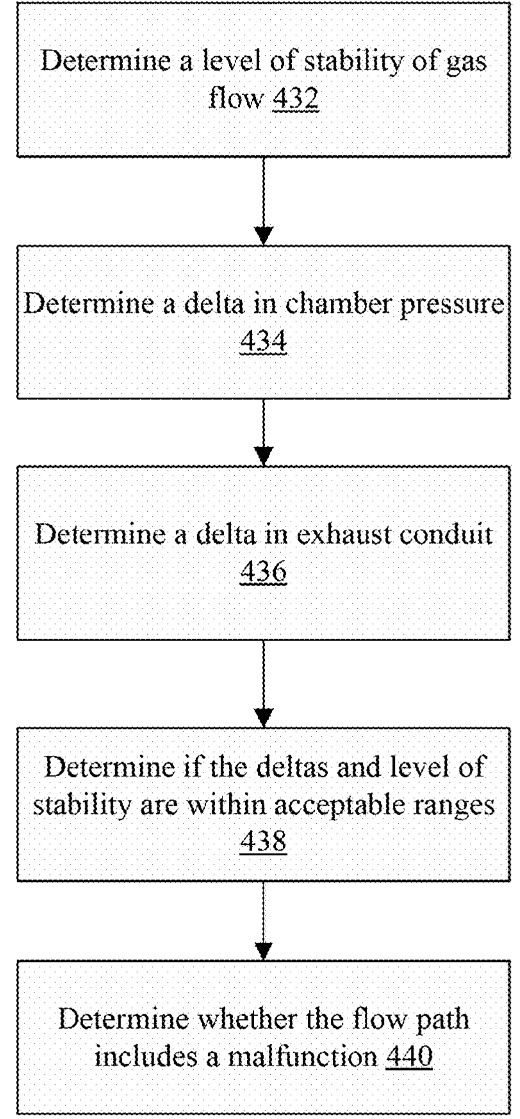
FIG. 4B illustrates a flow chart of a method for detecting a malfunction within a flow path of a gas distribution system, according to some embodiments of the present disclosure.

FIG. 4B illustrates a flow chart of a method 430 for detecting a malfunction within a flow path of a gas distribution system, according to some embodiments of the present disclosure.

Method 430 may be performed by processing logic that can include hardware (circuitry, dedicated logic, etc.), software (e.g., instructions run on a processing device), or a combination thereof. In one implementation, some, or all of the operations of method 430 can be performed by one or more components of system 100 of FIG. 1.

At block 432, processing logic can determine a delta in chamber pressure. In some embodiments, processing logic can determine a delta in chamber pressure data between a first time prior to enabling the gas flow through a flow path, a second time after enabling the gas flow through the flow path, and/or a third time after gas flow has stopped.

At block 434, processing logic can determine a delta in exhaust conduit pressure. In some embodiments, processing logic can determine a delta in exhaust conduit pressure data between the first time and the second time, between the first time and the third time, and/or between the second time and the third time.

At block 436, processing logic can determine a level of stability of gas flow. In some embodiments, processing logic can determine a level of stability of a gas flow rate through the first flow path.

At block 438, processing logic can determine if the deltas and level of stability are within acceptable ranges. In some embodiments, processing logic can determine whether the delta in the chamber pressure data, the delta in the exhaust conduit pressure data and the level of stability of the gas flow rate are within respective acceptable ranges.

At block 440, processing logic can determine whether the flow path includes a malfunction. In some embodiments, processing logic can identify a malfunction, responsive to any of the delta in the chamber pressure data, the delta in the exhaust conduit pressure data or the level of stability of the gas flow rate being outside of the respective acceptable ranges.

Figures 4C, 4D:
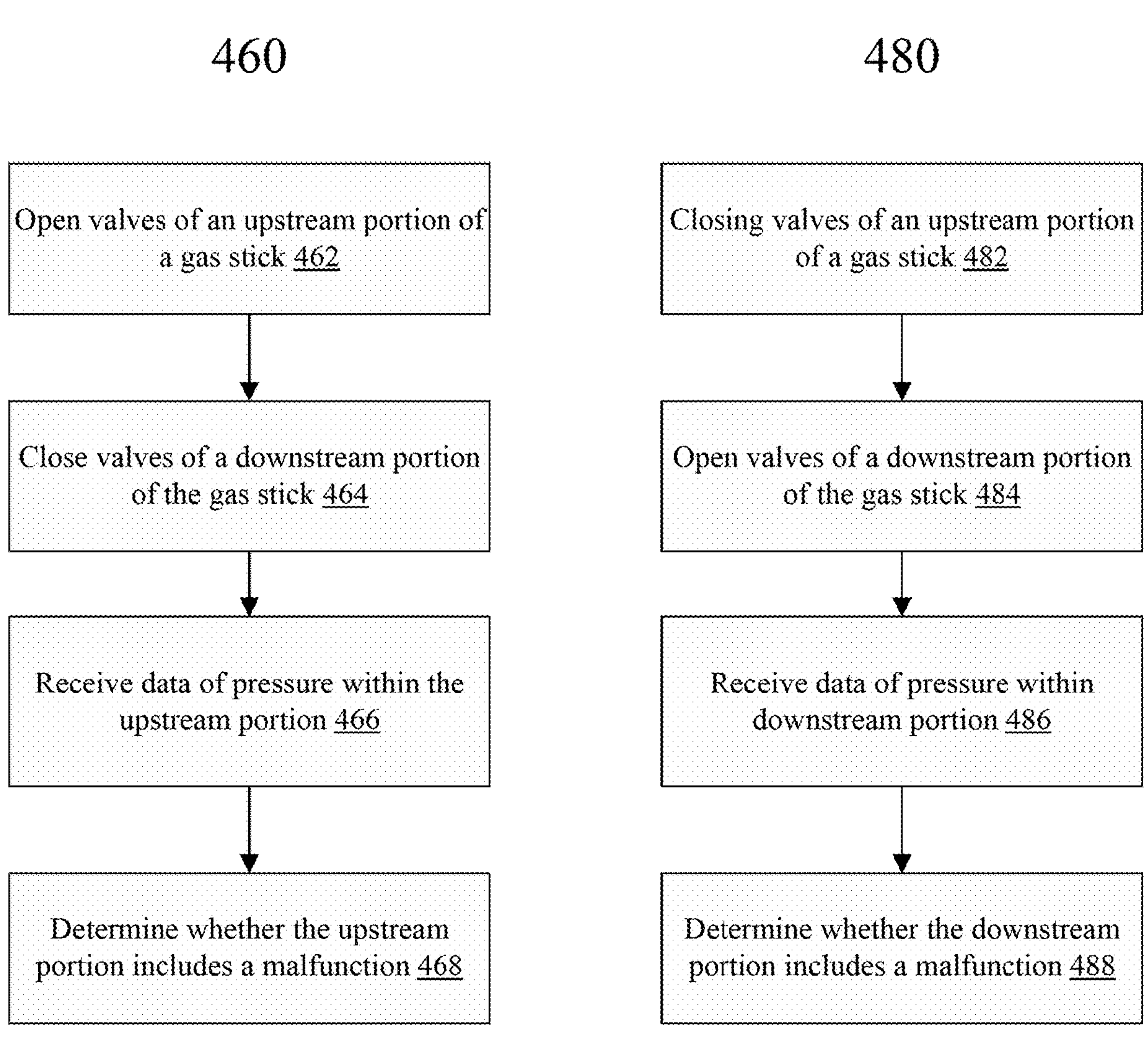
FIG. 4C illustrates an example flow chart of a method for determining the relative location of a malfunction within a flow path of a gas distribution system, according to some embodiments of the present disclosure.
FIG. 4D illustrates a flow chart of a method for determining the relative location of a malfunction within a flow path of a gas distribution system, according to some embodiments of the present disclosure.

FIG. 4C illustrates a flow chart of a method 460 for determining the relative location of a malfunction within a flow path of a gas distribution system, according to some embodiments of the present disclosure.

Method 460 may be performed by processing logic that can include hardware (circuitry, dedicated logic, etc.), software (e.g., instructions run on a processing device), or a combination thereof. In one implementation, some, or all of the operations of method 460 can be performed by one or more components of system 100 of FIG. 1.

At block 462, processing logic can open valves of an upstream portion of a gas stick. In some embodiments, processing logic can open one or more valves of an upstream portion of a gas stick associated with a flow path that is upstream of the at least one pressure sensor or flow sensor, such that gas flow advances through the upstream portion of the gas stick.

At block 464, processing logic can close valves of a downstream portion of the gas stick. In some embodiments, processing logic can close one or more valves of a downstream portion of the gas stick associated with the first flow path that is downstream of the at least one pressure sensor or flow sensor.

At block 466, processing logic can receive data of pressure within the upstream portion. In some embodiments, processing logic can receive, as the downstream portion of the gas stick is isolated, data indicative of a first pressure change within the upstream portion of the gas stick.

At block 468, processing logic can determine whether the upstream portion includes a malfunction. In some embodiments, processing logic can determine that the upstream portion of the gas stick includes the malfunction responsive to a determination that the first pressure change exceeds a first pressure change threshold.

FIG. 4D illustrates a flow chart of a method 480 for determining the relative location of a malfunction within a flow path of a gas distribution system, according to some embodiments of the present disclosure.

Method 480 may be performed by processing logic that can include hardware (circuitry, dedicated logic, etc.), software (e.g., instructions run on a processing device), or a combination thereof. In one implementation, some, or all of the operations of method 480 can be performed by one or more components of system 100 of FIG. 1.

At block 482, processing logic can close valves of an upstream portion of a gas stick. In some embodiments, processing logic can close one or more valves of an upstream portion of a gas stick associated with the first flow path that is downstream of the at least one pressure sensor or flow sensor.

At block 484, processing logic can open valves of a downstream portion of the gas stick. In some embodiments, processing logic can open one or more valves of a downstream portion of the gas stick associated with the flow path that is downstream of the MFC, such that the downstream portion of the gas stick is pressurized by a gas.

At block 486, processing logic can receive data of pressure within the downstream portion. In some embodiments, processing logic can receive second data indicative of a first pressure change within the downstream portion of the gas stick At block 488, processing logic can determine whether the downstream portion includes a malfunction. In some embodiments, processing logic can determine that the downstream portion of the gas stick includes the malfunction responsive to a determination that the first pressure change exceeds a first pressure change threshold.

Figure 5:
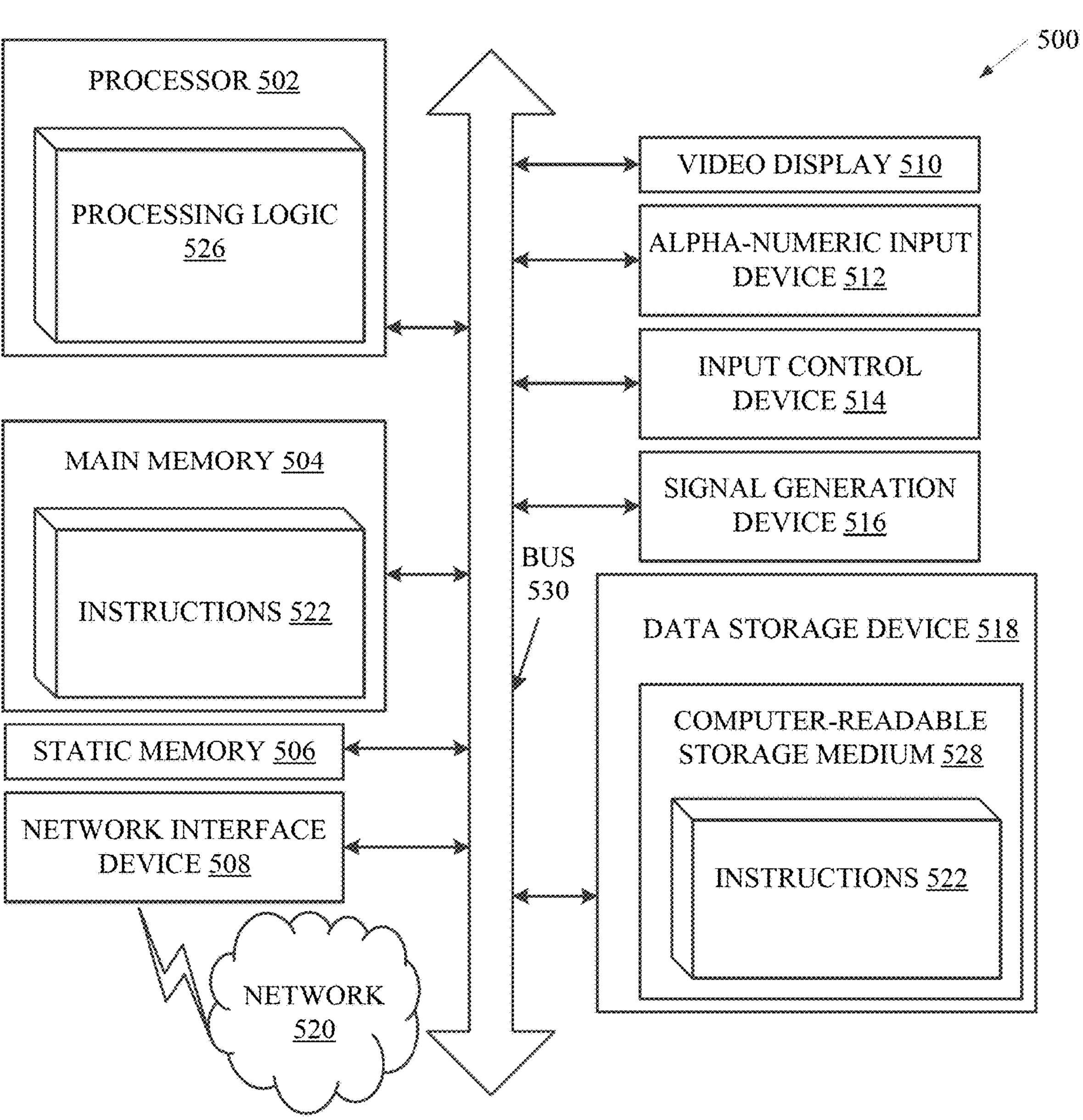
FIG. 5 illustrates an embodiment of a diagrammatic representation of a computing device associated with the system of FIG. 1, according to some embodiments of the present disclosure.

FIG. 5 illustrates an embodiment of a diagrammatic representation of a computing device associated with a substrate manufacturing system. In one implementation, the processing device 500 may be a part of any computing device associated with any of the above described figures, or any combination thereof. Example processing device 500 may be connected to other processing devices in a LAN, an intranet, an extranet, and/or the Internet. The processing device 500 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 500 may include a processor 502 (e.g., a CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processor 502 represents one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 502 may be configured to execute instructions (e.g. instructions 522 may include a computing subsystem as seen at least in FIG. 1).

Example processing device 500 may further comprise a network interface device 508, which may be communicatively coupled to a network 520. Example processing device 500 may further comprise a video display 510 (e.g., a liquid crystal display (LCD), a touch screen, or a cathode ray tube (CRT)), an alphanumeric input device 512 (e.g., a keyboard), an input control device 514 (e.g., a cursor control device, a touch-screen control device, a mouse), and a signal generation device 516 (e.g., an acoustic speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions.

Executable instructions 522 may also reside, completely or at least partially, within main memory 504 and/or within processor 502 during execution thereof by example processing device 500, main memory 504 and processor 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first," " "second," "third," "fourth," etc. as used herein are meant as labels to distinguish among different elements and may not necessarily have an ordinal meaning according to their numerical designation.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for detecting a malfunction within a gas distribution system, comprising:

enabling, by a controller, gas flow through a first flow path of the gas distribution system, wherein the first flow path comprises:

a gas stick comprising a first plurality of valves upstream of at least one of a pressure sensor or a flow sensor;

a processing chamber fluidly coupled to the gas stick; and an exhaust conduit fluidly coupled to the processing chamber and configured to exhaust gas flow from the gas distribution system;

receiving first data comprising at least one of first pressure data or first flow rate data associated with the first flow path of the gas distribution system while gas flow is enabled through the first flow path;

processing the first data to determine whether the first flow path of the gas distribution system comprises a malfunction;

responsive to determining that the first flow path comprises a malfunction, determining a relative location of the malfunction within the first flow path, with respect to the at least one pressure sensor or flow sensor within the first flow path; and generating a report indicating whether the first flow path comprises a malfunction and a relative location of any determined malfunction.

2. The method of claim 1, wherein the gas stick of the first flow path further comprises:

a second plurality of valves downstream of the at least one pressure sensor or flow sensor.

3. The method of claim 1, further comprising:

disabling, by the controller, the gas flow through the first flow path;

enabling, by the controller, gas flow through a second flow path of the gas distribution system;

receiving second data comprising at least one of second pressure data or second flow rate data associated with the second flow path of the gas distribution system while gas flow is enabled through the second flow path;

processing the second data to determine whether the second flow path of the gas distribution system comprises a malfunction; and responsive to determining that the second flow path comprises a malfunction, determining a relative location of the malfunction within the second flow path, with respect to at least one of a pressure sensor or a flow sensor within the second flow path;

wherein the report further indicates whether the second flow path comprises a malfunction and a relative location of any determined malfunction of the second flow path.

4. The method of claim 3, further comprising:

disabling, by the controller, the gas flow through the second flow path;

enabling, by the controller, gas flow through a third flow path of the gas distribution system;

receiving third data comprising at least one of third pressure data or third flow rate data associated with the third flow path of the gas distribution system while gas flow is enabled through the third flow path;

processing the third data to determine whether the third flow path of the gas distribution system comprises a malfunction; and responsive to determining that the third flow path comprises a malfunction, determining a relative location of the malfunction within the third flow path, with respect to at least one of a pressure sensor or a flow sensor within the third flow path;

wherein the report further indicates whether the third flow path comprises a malfunction and a relative location of any determined malfunction of the third flow path.

5. The method of claim 4, wherein the first flow path comprises a flow path for a first gas through the gas stick, wherein the second flow path comprises a flow path for the first gas through the gas stick and a bypass conduit that circumvents the processing chamber, and wherein the third flow path comprises a flow path for a second gas through the gas stick and the processing chamber or the bypass conduit.

6. The method of claim 1, wherein the first data comprises at least one of:

chamber pressure data indicative of a pressure within a processing chamber;

exhaust conduit pressure data indicative of a pressure within an exhaust conduit;

gas stick pressure data indicative of a pressure within a portion of a gas stick comprising the at least one pressure sensor or flow sensor; or gas stick flow rate data indicative of a flow rate within a portion of the gas stick comprising the at least one of pressure sensor or flow sensor.

7. The method of claim 1, wherein processing the first data to determine whether the first flow path of the gas distribution system comprises a malfunction, comprises:

determining a delta in chamber pressure data between a first time prior to enabling the gas flow through the first flow path and a second time after enabling the gas flow through the first flow path;

determining a delta in exhaust conduit pressure data between the first time and the second time;

determining a level of stability of a gas flow rate through the first flow path; and determining whether the delta in the chamber pressure data, the delta in the exhaust conduit pressure data and the level of stability of the gas flow rate are within respective acceptable ranges, wherein a malfunction is identified responsive to any of the delta in the chamber pressure data, the delta in the exhaust conduit pressure data or the level of stability of the gas flow rate being outside of the respective acceptable ranges.

8. The method of claim 1, wherein processing the first data to determine whether the first flow path of the gas distribution system comprises a malfunction, comprises:

determining a delta in chamber pressure data between a first time prior to enabling the gas flow through the first flow path and a second time after disabling the gas flow through the first flow path;

determining a delta in exhaust conduit pressure data between the first time and the second time;

determining a level of stability of a gas flow rate through the first flow path; and determining whether the delta in the chamber pressure data, the delta in the exhaust conduit pressure data and the level of stability of the gas flow rate are within respective acceptable ranges, wherein a malfunction is identified responsive to any of the delta in the chamber pressure data, the delta in the exhaust conduit pressure data or the level of stability of the gas flow rate being outside of the respective acceptable ranges.

9. The method of claim 1, wherein determining the relative location of the malfunction within the first flow path comprises:

opening one or more valves of an upstream portion of the gas stick associated with the first flow path that is upstream of the at least one pressure sensor or flow sensor, such that gas flow advances through the upstream portion of the gas stick;

closing one or more valves of a downstream portion of the gas stick associated with the first flow path that is downstream of the at least one pressure sensor or flow sensor;

receiving, as the downstream portion of the gas stick is isolated, second data indicative of a first pressure change within the upstream portion of the gas stick; and determining that the upstream portion of the gas stick comprises the malfunction responsive to a determination that the first pressure change exceeds a first pressure change threshold.

10. The method of claim 1, wherein determining the relative location of the malfunction within the first flow path, comprises:

closing one or more valves of an upstream portion of the gas stick associated with the first flow path that is upstream of the at least one pressure sensor or flow sensor;

opening one or more valves of a downstream portion of the gas stick associated with the first flow path that is downstream of the at least one pressure sensor or flow sensor;

receiving second data indicative of a first pressure change within the downstream portion of the gas stick; and determining that the downstream portion of the gas stick comprises the malfunction responsive to a determination that the first pressure change exceeds a first pressure change threshold.

11. The method of claim 1, wherein determining the relative location of the malfunction within the first flow path comprises determining that the malfunction is associated with one or more components of the first flow path that are downstream of the at least one pressure sensor or flow sensor, or determining that the malfunction is associated with one or more components of the first flow path that are upstream of the at least one pressure sensor or flow sensor.

12. A non-transitory computer readable storage medium comprising instructions that, when executed by a processing device, cause the processing device to perform operations comprising:

enabling, by a controller, gas flow through a first flow path of a gas distribution system, wherein the first flow path comprises:

a gas stick comprising a first plurality of valves upstream of at least one of a pressure sensor or a flow sensor;

a processing chamber fluidly coupled to the gas stick; and an exhaust conduit fluidly coupled to the processing chamber and configured to exhaust gas flow from the gas distribution system;

receiving first data comprising at least one of first pressure data or first flow rate data associated with the first flow path of the gas distribution system while gas flow is enabled through the first flow path;

processing the first data to determine whether the first flow path of the gas distribution system comprises a malfunction;

responsive to determining that the first flow path comprises a malfunction, determining a relative location of the malfunction within the first flow path, with respect to the at least one pressure sensor or flow sensor within the first flow path; and generating a report indicating whether the first flow path comprises a malfunction and a relative location of any determined malfunction.

13. The non-transitory computer readable storage medium of claim 12, wherein the gas stick of the first flow path further comprises:

a second plurality of valves downstream of the at least one pressure sensor or flow sensor.

14. The non-transitory computer readable storage medium of claim 12, wherein the operations performed by the processing device further comprise:

disabling, by the controller, the gas flow through the first flow path;

enabling, by the controller, gas flow through a second flow path of the gas distribution system;

receiving second data comprising at least one of second pressure data or second flow rate data associated with the second flow path of the gas distribution system while gas flow is enabled through the second flow path;

processing the second data to determine whether the second flow path of the gas distribution system comprises a malfunction; and responsive to determining that the second flow path comprises a malfunction, determining a relative location of the malfunction within the second flow path, with respect to at least one of a pressure sensor or a flow sensor within the second flow path;

wherein the report further indicates whether the second flow path comprises a malfunction and a relative location of any determined malfunction of the second flow path.

15. The non-transitory computer readable storage medium of claim 14, wherein the operations performed by the processing device further comprise:

disabling, by the controller, the gas flow through the second flow path;

enabling, by the controller, gas flow through a third flow path of the gas distribution system;

receiving third data comprising at least one of third pressure data or third flow rate data associated with the third flow path of the gas distribution system while gas flow is enabled through the third flow path;

processing the third data to determine whether the third flow path of the gas distribution system comprises a malfunction; and responsive to determining that the third flow path comprises a malfunction, determining a relative location of the malfunction within the third flow path, with respect to at least one of a pressure sensor or a flow sensor within the third flow path;

wherein the report further indicates whether the third flow path comprises a malfunction and a relative location of any determined malfunction of the third flow path.

16. The non-transitory computer readable storage medium of claim 15, wherein the first flow path comprises a flow path for a first gas through the gas stick, wherein the second flow path comprises a flow path for the first gas through the gas stick and a bypass conduit that circumvents the processing chamber, and wherein the third flow path comprises a flow path for a second gas through the gas stick and the processing chamber or the bypass conduit.

17. A system comprising:

a memory device; and a processing device communicatively coupled to the memory device, wherein the processing device is configured to:

enable gas flow through a first flow path of a gas distribution system, wherein the first flow path comprises:

a gas stick comprising a first plurality of valves upstream of at least one of a pressure sensor or a flow sensor;

a processing chamber fluidly coupled to the gas stick; and an exhaust conduit fluidly coupled to the processing chamber and configured to exhaust gas flow from the gas distribution system;

receive first data comprising at least one of first pressure data or first flow rate data associated with the first flow path of the gas distribution system while gas flow is enabled through the first flow path;

process the first data to determine whether the first flow path of the gas distribution system comprises a malfunction;

responsive to determining that the first flow path comprises a malfunction, determine a relative location of the malfunction within the first flow path, with respect to the at least one pressure sensor or flow sensor within the first flow path; and generate a report indicating whether the first flow path comprises a malfunction and a relative location of any determined malfunction.

18. The system of claim 17, wherein the gas stick of the first flow path further comprises:

a second plurality of valves downstream of the at least one pressure sensor or flow sensor.

19. The system of claim 17, wherein the processing device is further configured to:

disable the gas flow through the first flow path;

enable gas flow through a second flow path of the gas distribution system;

receive second data comprising at least one of second pressure data or second flow rate data associated with the second flow path of the gas distribution system while gas flow is enabled through the second flow path;

process the second data to determine whether the second flow path of the gas distribution system comprises a malfunction; and responsive to determining that the second flow path comprises a malfunction, determine a relative location of the malfunction within the second flow path, with respect to at least one pressure sensor or flow sensor within the second flow path;

wherein the report further indicates whether the second flow path comprises a malfunction and a relative location of any determined malfunction of the second flow path.

* * * * *